United States Patent
Hesse et al.

(10) Patent No.: US 6,998,099 B2
(45) Date of Patent: Feb. 14, 2006

(54) METHOD FOR DESULPHURIZING ACID GASES USING CATALYSTS THAT ARE INSENSITIVE TO OXIDATION AND CONTAIN AMINOCARBOXYLATE

(75) Inventors: Werner Hesse, Obrigheim (DE); Hans-Ulrich Jäger, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/488,921

(22) PCT Filed: Sep. 10, 2002

(86) PCT No.: PCT/EP02/10131

§ 371 (c)(1),
(2), (4) Date: Mar. 12, 2004

(87) PCT Pub. No.: WO03/022406

PCT Pub. Date: Mar. 20, 2003

(65) Prior Publication Data
US 2004/0241068 A1 Dec. 2, 2004

(30) Foreign Application Priority Data
Sep. 12, 2001 (DE) .................. 101 44 890

(51) Int. Cl.
*B01J 8/00* (2006.01)
(52) U.S. Cl. .............. 423/230; 423/244.1; 423/244.09; 423/231; 423/226
(58) Field of Classification Search .......... 423/242.1, 423/242.2, 242.7, 243.01, 243.03, 244.09, 423/244.1, 230, 231, 225, 226
See application file for complete search history.

(56) References Cited

U.S. PATENT DOCUMENTS

| 4,528,817 A | 7/1985 | Jernigan |
| 4,758,416 A | 7/1988 | Fong et al. |
| 5,591,417 A | 1/1997 | Buchanan et al. |
| 5,591,419 A | 1/1997 | McManus et al. |
| 5,783,524 A | 7/1998 | Greindl et al. |

FOREIGN PATENT DOCUMENTS

GB 1 543 748 4/1979

OTHER PUBLICATIONS

Derek McManus, et al., Journal of Molecular Catalysis A: Chemical, vol. 117, pp. 289-297 1997, no month.
Dian Chen, et al., Can. J. Chem., vol. 71, pp. 1524-1531 1993, no month.

*Primary Examiner*—Edward M. Johnson
(74) *Attorney, Agent, or Firm*—Oblon, Spivak, McClelland, Maier & Neustadt, P.C.

(57) ABSTRACT

A process is described for the catalytic removal of $H_2S$ gas from a sour gas stream in the presence of a chelate ligand of the formula (I)

$$XOOC-\underset{R^3\ R^4}{\underset{|}{C}}-\underset{R^1\ R^2}{\overset{|}{C}}-N-(CR^5R^6)_n-COOX \quad (I)$$

where:
X is hydrogen, an alkali metal or $NH_4^+$,
n is 1, 2 or 3, and
at least one of the radicals $R^1$ to $R^6$ is alkyl, aryl, alkyloxy, aryloxy, carboxyl or hydroxyl, the remaining radicals being hydrogen, and
the metal in the metal chelate complex is a polyvalent metal, which can occur in more than one oxidation state.

A mixture is also described for removing $H_2S$ gas from a sour gas stream, the mixture comprising an aminocarboxylate-containing metal chelate complex, and the use is also described of an aminocarboxylate-containing metal chelate complex for removing $H_2S$ gas from a sour gas stream.

12 Claims, 5 Drawing Sheets

METHOD FOR DESULPHURIZING ACID GASES USING CATALYSTS THAT ARE INSENSITIVE TO OXIDATION AND CONTAIN AMINOCARBOXYLATE

The invention relates to a process for the catalytic removal of $H_2S$ gas from a sour gas stream in the presence of aminocarboxylate-containing catalysts, a mixture for removing $H_2S$-Gas from a sour gas stream, the mixture comprising an aminocarboxylate-containing metal chelate complex, and to the use of an aminocarboxylate-containing metal chelate complex for removing $H_2S$ gas from a sour gas stream.

The presence of considerable amounts of $H_2S$ in various industrial sour gas streams is a great environmental problem. Various processes are known which relate to the removal of $H_2S$ from the sour gases. The important processes for removing $H_2S$ gas from sour gases are called the liquid redox processes. In these processes the $S^{2-}$ ion of $H_2S$ is oxidized to elemental sulfur in aqueous solution and a redox catalyst is reduced. One of the first processes operating according to this principle is the Stretford process, in which vanadium catalysts are used. Since this process has problems with respect to environmental aspects, it is increasingly being replaced by processes in which a redox catalyst based on other metals is used. In most of these processes, iron is used as metal. In this case a soluble iron(III) chelate complex acts as redox partner which, when the $S^{2-}$ ion is oxidized to elemental sulfur is itself reduced to an ion(II) chelate complex. The iron complex-containing scrubbing solution is treated with atmospheric oxygen gas, the iron(II) being oxidized back to iron(III) and the scrubbing solution being able to be thus recirculated. In this process it is important that the concentration of the iron chelate complex in the solution is sufficiently high to achieve efficient conversion rates. In addition, a precipitation of iron salts is undesirable in any phase of the process. Therefore the iron ion is kept in solution in complexed form. Usually, for this purpose, aminocarboxylate compounds are used, such as nitrilotriacetic acid (NTA), ethylenediaminetetraacetic acid (EDTA) and hydroxyethylenediaminetriacetic acid (HEDTA). These complexes have the disadvantage that they are partially decomposed during the regeneration.

Thus D. McManus et al., Journal of Molecular Catalysis A: Chemical 117 (1997) 289–297 relates to a study of the rate of decomposition of various iron chelate complexes. Nitrilotriacetic acid (NTA), ethylenediaminetetraacetic acid (EDTA), iminodiacetate (IDA), diethylenetriaminepentaacetic acid (DTPA) and cyclohexanediaminetetraacetic acid (CDTA) were studied with respect to their decomposition rates and criteria for ligand selection were developed.

A similar study of the decomposition rate of various metal chelate catalysts is disclosed in Arthur I. Martell et al., Can. J. Chem. Vol. 71, 1993, 1524–1531. The results show that, in a comparison of HEDTA, EDTA and NTA, HEDTA decomposes most rapidly, followed by EDTA, whereas NTA is the most stable.

Nevertheless, the oxidation stability of these complexes is not sufficient. U.S. Pat. No. 5,591,417 relates to an improved oxidation/reduction process, in which catalysts are used which contain pyridine phosphonates as chelate ligands. According to U.S. Pat. No. 5,591,419, these complexes are more stable toward oxidative decomposition of the active metal chelate. However, these ligands are expensive and are only available with difficulty for technical applications.

Therefore, there is a further need for novel chelate compounds which have the following properties:

Firstly, the complexes should be available in commercial amounts at moderate costs. Furthermore, no toxicity or low toxicity is desirable, as is good environmental compatibility. Thus, for example, EDTA and HEDTA re not readily biodegradable and NTA, which is readily biodegradable, gives indications of toxicological concern, in particular in the case of iron NTA.

Furthermore, the transfer of $H_2S$ gas into a liquid phase in an aqueous system at high pHs is particularly efficient. The metal chelate complexes should therefore be thermodynamically stable at pHs up to 9 or above, in order to avoid the precipitation of $Fe(OH)_2$ and $Fe(OH)_3$.

Furthermore, the stability of the iron(II) chelate complex must be sufficient to prevent the precipitation of FeS under slightly alkaline conditions.

In addition, the stability difference between the iron(II) and iron(III) chelate complexes must be small enough for it to be possible for the iron(III) chelate complex to be reduced by $H_2S$ to iron(II) chelate complexes. If the iron(III) chelate complex is too stable, the chelate complex remains in the iron(III) state and the $H_2S$ is not oxidized.

Furthermore, the iron(III) chelate complex must be more stable than the iron(II) chelate complex, so that oxidation of the iron(II) chelate complex by dissolved oxygen is the preferred reaction during regeneration. Thus chelate complexes that stabilize iron(II) compared with iron(III) in this process are not suitable.

Finally, these iron chelate complexes must be stable to decomposition by oxygen or free radicals and ions resulting therefrom in solution.

It is an object of the present invention, therefore, to provide a metal chelate complex which complies with said criteria, in particular oxidation stability.

We have found that this object is achieved by a process for the catalytic removal of $H_2S$ gas from a sour gas stream comprising:

a) reducing the amount of $H_2S$ in the sour gas stream by reacting the $H_2S$-containing sour gas stream with an aqueous solution containing a metal chelate complex, a chelate ligand of the general formula (I) being used where:

X is hydrogen, alkali metal or $NH_4^+$, preferably hydrogen or sodium, where the chelate ligand of the formula (I) can be a tricarboxylic acid, a monosodium, disodium or trisodium salt, n is 1 or 2 at least one of the radicals $R^1$ to $R^6$ is alkyl, aryl, aryloxy, carboxyl, alkyloxy or hydroxyl, the remaining radicals being hydrogen, and the metal in the metal chelate complex is a polyvalent metal, which can occur in more than one oxidation state;

at least a part of the metal, after reaction of the $H_2S$-containing sour gas stream, being present in a lower oxidation state (reduced form) than before the reaction;

b) regenerating the mixture obtained in step a) comprising elemental sulfur and the metal chelate complex, in which at least a part of the metal is present in reduced form, with an oxidizing agent, the reduced form of the metal being oxidized to the metal in the original oxidation state; and c) recirculating the regenerated polyvalent metal chelate complex to step a);

with steps a) and b) being able to be carried out in a single reaction vessel.

For the purposes of the invention, a sour gas stream means all gas streams that comprise $H_2S$ as an interfering by-product. Such gases are natural gas, synthesis gas, hydrocarbon mixtures from coal gasification, hydrocarbon mixtures from "hydrotreating" petroleum fractions, carbon dioxide used in enhanced oil recovery, off-gases from viscose production, off-gases from silicon carbide production, off-gases from plants for producing geothermal energy and off-gases produced in wastewater treatment.

The $H_2S$ content in the sour gas stream can vary widely. A sour gas stream having a few ppm of $H_2S$ can be used; however, the sour gas stream can also comprise $H_2S$ as main constituent.

a) Reducing the $H_2S$ Amount in the Sour Gas Stream via Reaction with Metal Chelate Complexes The inventively used metal chelate complexes contain chelate ligands that are derived from nitrilotriacetic acid. These are substituted nitrilotriacetic acid derivatives. In these substituted nitrilotriacetic acid derivatives of the formula (I), at least one of the radicals $R^1$ to $R^6$ is alkyl, aryl, aryloxy, carboxyl, alkyloxy or hydroxyl, and the remaining radicals are hydrogen atoms. Preferably, one to three of the radicals $R^1$ to $R^6$ are corresponding radicals, particularly preferably, one of the radicals $R^1$ to $R^6$ is a corresponding radical. Very particularly preferably, only the radical $R^6$ is an alkyl, aryl, aryloxy, carboxyl, alkyloxy or hydroxyl radical, while the remaining radicals are hydrogen.

The at least one of the radicals $R^1$ to $R^6$ is alkyl, aryl, aryloxy, carboxyl, alkyloxy or hydroxyl, preferably alkyl, carboxyl or hydroxyl, particularly preferably $C_1$ to $C_6$ alkyl or hydroxyl, very particularly preferably $C_1$ to $C_3$ alkyl and in particular methyl.

n can be 1, 2 or 3, that is to say between the nitrogen atom and one of the carboxyl groups there is a C1 (n=1), C2 (n=2) or C3 (n=3) bridge. Preferably, n=1.

Thus, very particularly preferably, methylglycine diacetic acid (MGDA) or the corresponding monosodium, disodium or trisodium salt is used as chelate ligand.

However, compounds are also suitable where n=2. Among these compounds, isoserinediacetic acid (ISDA) or the corresponding monosodium, disodium or trisodium salt is particularly preferred.

Polyvalent metals which are suitable for forming the metal chelate complex are generally selected from copper, cobalt, vanadium, manganese, platinum, tungsten, nickel, mercury, tin, lead and iron. Preferred suitable metals are selected from copper, cobalt, nickel, manganese and iron. Very particularly preferably, iron is used as polyvalent metal.

Although the inventively used metal chelate complexes have a high oxidation stability compared with the metal chelate complexes used in the prior art, it is possible that the aqueous solution additionally comprises a stabilizing reagent. All customary stabilizing reagents are suitable here. Thus, for example, ammonium thiosulfate, alkali metal thiosulfates, alkaline earth metal thiosulfates, precursors for ammonium thiosulfate and thiosulfate ions can be used. In addition, certain low-molecular-weight aliphatic alcohols are suitable for avoiding the precipitation of substances and to delay or inhibit decomposition of the metal chelate complexes. These low-molecular-weight alcohols are generally monohydric, dihydric or polyhydric alcohols. Preference is given to alcohols having from three to eight carbon atoms, particularly preferably t-butanol, isopropanol, ethylene glycol, propylene glycol and sorbitol.

These stabilizing reagents can be used in an amount of generally from 0.1 to 1.5 mol of stabilizing reagent, preferably alcohol, per mole of metal chelate complex, preferably from 0.3 to 1.0 mol of stabilizing reagent, preferably alcohol, per mole of metal chelate complex.

The inventive process is what is called a liquid redox process. Differing process variants of the liquid redox process are known, with the inventive process being able to be used in all process variants. The best-known liquid redox processes are the Stretford® process, in which metal complexes based on vanadium/anthraquinone are used, the Takahax® process, in which vanadium/anthraquinone complexes are also used, the Sulfint® process, in which iron chelate complexes are used, the Sulferox® process and the Lo-Cat® process, with iron chelate complexes also being used in the two last-mentioned. Since the use of iron chelate complexes is particularly preferred according to the inventive process, the inventive process is preferably used in a Sulfint®, Sulferox® or LoCat® process. In addition to other processing differences, these differ in particular in the concentration of the iron chelate complex used.

The inventive process can be used in a broad concentration range of the metal ions. Generally, the metal ion concentration in the inventive process is from 0.001 to 6 mol/l, preferably from 0.001 to 4 mol/l, particularly preferably from 0.001 to 3 mol/l. If iron is used as metal ion, the iron concentration in the Sulfint® process is about 0.001 mol/l, in the LoCat® process about 0.02 mol/l, and in the Sulferox® process, from 0.01 to 3 mol/l.

A further important parameter in the liquid redox processes for removing $H_2S$ gas in a sour gas stream in the presence of metal chelate complexes, in particular iron chelate complexes, is the pH. The transfer of $H_2S$ gas into the liquid phase in aqueous systems is particularly efficient at high pHs. However, it is a problem that, in particular at high pHs, the hydroxides of the corresponding metal precipitate out in the case of iron $Fe(OH)_2$, and particularly $Fe(OH)_3$. The metal chelate complexes must therefore have sufficiently high thermodynamic stabilities, in particular at high pHs. The inventive process is carried out in aqueous solutions having a pH of generally from 4 to 12, preferably from 5 to 11, particularly preferably from 6 to 9. That is to say the inventively used metal chelate complex is sufficiently thermodynamically stable at pHs of up to 12 so as to prevent the precipitation of metal hydroxides, if appropriate with the addition of stabilizing reagents, preferably alcohols. Suitable stabilizing reagents have already been mentioned above.

In the course of the reaction, in step a), owing to the acidic nature of $H_2S$, the pH decreases. The pH decreases further, if the sour gas used comprises further acidic species, for example carbon dioxide. However, since the reaction is more efficient at high pHs than at low pHs, it is preferred to add alkaline materials to the aqueous reaction solution. Suitable alkaline materials are, for example, NaOH, KOH, ammonia, alkali metal carbonates or alkali metal bicarbonates. These are generally continuously added to the system to neutralize the acidic components in the reaction mixture. Alkaline materials can be added at any stage of the inventive process. However, the alkaline materials are preferably added in the regeneration stage in step b).

The temperature in the inventive process is generally not critical. Usually, the inventive process is carried out at temperatures from 5 to 100° C., preferably from 10 to 90° C., particularly preferably from 20 to 60° C.

The pressure in the inventive processes is not critical. Preferably, the inventive process is carried out at atmospheric pressure.

The inventively used chelate ligands are prepared by suitable preparation processes, for example via Strecker syntheses, which are known to those skilled in the art.

The inventively used metal chelate complexes are generally obtained by reacting the corresponding chelate ligands of the formula (I) with a suitable metal salt, metal oxide or hydroxide in aqueous solution, in the presence or absence of alkali metal ions or ammonium ions, or by reacting the corresponding ammonium salts or alkali metal salts. The exact reaction conditions are known to those skilled in the art. The ratio of metal to chelate ligand is generally from 1 to 4 to 2 to 1, preferably from 1 to 3 to 1.5 to 1, particularly preferably from 1 to 2 to 1.2 to 1.

The contact times between the inventively used metal chelate complex and the $H_2S$-containing sour gas stream in the aqueous solution in step a) can vary widely. Generally, the contact times are in the range from 0.5 sec to 120 sec, preferably from 1 sec to 60 sec, particularly preferably from 1 sec to 10 sec.

Generally, more than 90% by weight of the $H_2S$ is removed from the sour gas stream, preferably more than 95% by weight, particularly preferably more than 99% by weight.

b) Regenerating the Mixture Obtained in Step a)

In step b), the mixture obtained in step a) which comprises elemental sulfur and the metal chelate complex, in which at least a part of the metal is present in reduced form, is regenerated by an oxidizing agent, the reduced form of the metal being oxidized to the metal in the original oxidation state.

Preferably, the mixture obtained in step a) is brought into contact with oxygen as oxidizing agent. For the purposes of the present invention, the term oxygen is not restricted to pure oxygen, but further includes air, oxygen-enriched air, or other oxygen-containing gases.

The oxidizing agent is generally used in a stoichiometric ratio, or preferably in excess, in relation to the metal present in reduced form (in the form of the metal complex).

The mixture obtained in step a) is contacted with the oxidizing agent, in a preferred embodiment, by bubbling air into the chelate solution, for example in a countercurrent process.

The temperature in the regeneration step b) of the inventive process can be varied within a broad range. Generally, step b) is carried out at the same temperature as step a). The temperature in step b) may be slightly lower. Thus, step b) is generally carried out at temperatures from 5 to 100° C., preferably from 10 to 90° C., particularly preferably from 20 to 60° C.

The pressure in step b) can also be varied within a broad range. Generally, step b) is carried out at atmospheric pressure.

The pH also preferably corresponds to the pH established in step a). It is generally from 4 to 12, preferably from 5 to 11, particularly preferably from 6 to 9.

The elemental sulfur formed in step a) is removed from the reaction mixture. The sulfur can be removed not only before, but also after or during the regeneration step b). In a preferred embodiment, the sulfur is removed from the mixture obtained in step a) before or during the regeneration step b). The sulfur can be removed by suitable methods known to those skilled in the art. For example, it is possible to select the sulfur by settling in the reactor in which step a) is carried out. This can then be removed from the system at intervals, or else continuously taken off via a valve. In addition, it is possible to remove the sulfur from the aqueous system by filtration, flotation, centrifugation, or melting and removal by phase separation, or by suitable apparatuses that are known to those skilled in the art. Not necessarily all of the sulfur need be removed in this case. The subsequent process steps can also be carried out if a residue of the sulfur remains in the mixture Subsequently to the regeneration step b) in which the form of the metal which was reduced in step a) is oxidized to the original oxidation state of the metal, the regenerated polyvalent metal chelate complex is recirculated to step a).

c) Recirculation of the Regenerated Polyvalent Metal Chelate Complex to Step a)

Before the recirculation, generally the excess oxidizing agent, preferably excess air, is removed from the mixture using a method known to those skilled in the art. The solution which is regenerated and freed from the excess oxidizing agent is recirculated to step a). The ratio of the reduced form of the metal to the form of the metal in the original oxidation state is generally from 1 to 10 to 1 to 1000, preferably from 1 to 50 to 1 to 1000.

d) Suitable Apparatuses

Generally, any process can be used which is known from the prior art and makes possible intensive contact between the $H_2S$ gas-containing sour gas and the aqueous metal chelate complex solution. It is possible to carry out the inventive process in an aerobic system in which the $H_2S$ is oxidized and the metal chelate complex solution is regenerated in countercurrent in the same reactor. An anaerobic procedure is also possible, in which the $H_2S$ is oxidized and the metal chelate complex solution regenerated in separate reactors or separate reaction zones of one reactor.

The reactor in step a) is preferably an absorber, in which case any suitable absorbers can be used. These are, for example, static mixers, packed columns, for example scrubbing columns, or venturis. Suitable reactors for carrying out step b) are, for example, packed columns, spray towers and reactors equipped with gas sparging.

e) Other Additives

The mixtures present in the inventive process can further comprise other additives which are known to those skilled in the art. Such additives are, for example, buffer substances, such as phosphate buffer or carbonate buffer. Other additives are, for example, sodium oxalate, sodium formate, sodium acetate and additives which facilitate the removal of sulfur, antifoam agents and/or wetting agents. In addition, the stabilizer reagents already specified above can be added.

Figure 1:
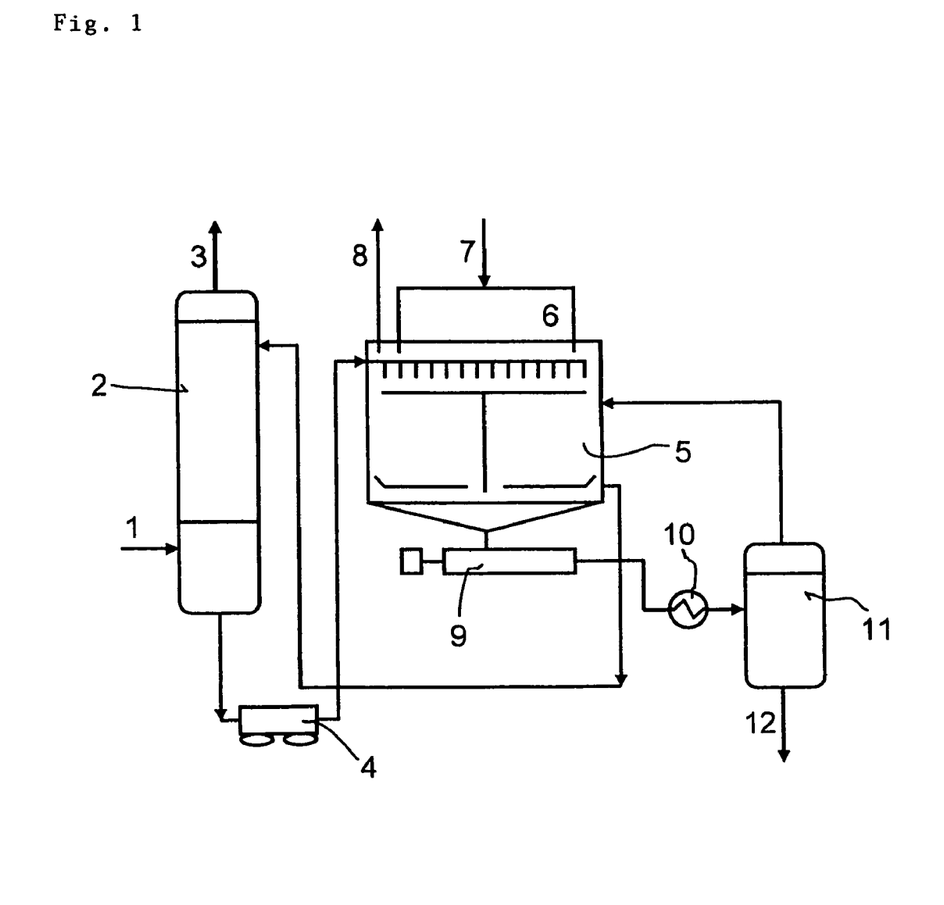

In a very particularly preferred embodiment, the inventive process is carried out as follows, preferably in an apparatus shown in FIG. 1:

In FIG. 1:

1 is an $H_2S$ gas-containing sour gas stream
2 is an absorber
3 is treated $H_2S$-free gas
4 is a cooler
5 is a regeneration reactor
6 is oxidation 7 is air
8 is excess/spent air
9 is a sludge pump
10 is a heat exchanger
11 is a separator
12 is liquid sulfur An $H_2S$ gas-containing sour gas stream 1 is fed to a reactor (absorber) 2, where it is brought into contact with an aqueous solution of the inventive metal chelate complex. This solution is preferably obtained by recirculation of the mixture regenerated in step b). The gas stream which leaves the reactor (absorber) in step a) has a decreased $H_2S$ content, or is $H_2S$ free. There remains behind a mixture that comprises sulfur (in elemental form) and the inventive metal chelate complex in which the metal is in reduced form. This mixture is fed to a further reactor 5, or to a further reaction zone, in which regeneration (oxidation 6; step b)) takes place. For this, an oxygen-containing gas stream, preferably air 7, is passed into the reactor in which the regeneration (oxidation) takes place. The sulfur, which preferably settles on the bottom of the reactor, is preferably continuously removed from the process, for which a part of the mixture is fed to an apparatus for removing the sulfur (separator) 11, after which the sulfur is preferably liquefied in a heat exchanger 10. After the sulfur is separated off, this part of the mixture is again fed to the reactor in which the regeneration is carried out, while the sulfur 12 which is separated off, usually in liquid form, can be utilized further. In the regeneration step b), the reduced form of the metal, which is present in the form of the inventive metal chelate complex, is oxidized 6 by feeding oxygen, preferably in the form of air 7. During the regeneration, an excess of oxygen or of oxygen-containing gas is removed 8 from the reactor. The metal chelate complex solution which is then regenerated is fed back in accordance with step c) of the inventive process into the reactor (absorber) in which step a) takes place.

The present application further relates to a mixture for removing $H_2S$ gas from a sour gas stream that comprises at least one metal chelate complex, as has already been described above. Preferably, this mixture additionally comprises a stabilizer reagent. Suitable stabilizer reagents have already been described above. Furthermore, further additives can also be present in the inventive mixture, with suitable additives likewise having been specified above.

This mixture is preferably used in a process comprising steps a), b) and c), as described above.

The present invention further relates to the use of a metal chelate complex according to the present invention for removing $H_2S$ gas from a sour gas stream.

The following examples additionally describe the invention.

EXAMPLES

In the examples below, the following metal chelate complexes were used:
a) metal chelate complex of iron and methylglycinediacetic acid (MGDA) in a ratio of 1:2 (according to the invention)
b) metal chelate complex of iron and nitrilotriacetic acid (NTA) in a ratio of 1:2 (comparative experiment)

1. Preparation of the Metal Chelate Complexes (General Working Protocol)

In a reaction vessel, 0.036 mol of the sodium salt of the corresponding chelate complex is dissolved in distilled water, 0.018 mol of $Fe(NO_3)_3 \cdot 9\ H_2O$ is added and the mixture is made up to 1 l with distilled water. The pH is adjusted to 8.5 using dilute NaOH or dilute $HNO_3$, depending on the solution. 1 l of an iron(III) chelate complex solution is obtained.

2. Removal of $H_2S$ Gas from an Aqueous Solution (General Working Protocol)

800 ml of the respective solution prepared under 1. are transferred to a reaction vessel and purged with nitrogen for approximately 5 min via a glass frit situated in the flask.

The respective experimental solution is then, again via the glass frit, treated with $H_2S$ gas at a gas flow rate of approximately 4 l/h for about 10 min. The sulfur ($S^{2-}$) contained in the $H_2S$ is oxidized by the $Fe^{3+}$ contained in the respective iron chelate complex, the $Fe^{3+}$ being reduced to $Fe^{2+}$ and elemental sulfur being formed which accumulates in the reaction vessel in the course of the experiment. The mixture is then purged with nitrogen for approximately 5 min, as at the start.

The experimental solution is then regenerated for about 1 hour with air via the glass frit at an air flow rate of approximately 80 l/h. The oxygen present in the air oxidizes the $Fe^{2+}$ then present in the iron chelate complex back into $Fe^{3+}$.

The procedure described above gives a cycle which is repeated n times, depending on the duration of the experiment.

The experimental conditions of the process described are listed below:
Temperature: room temperature
Pressure: atmospheric pressure
$H_2S$ flow rate: approximately 4 l/h (approximately 10 min per cycle)
$N_2$ flow rate: approximately 4 l/h (approximately 5 min per cycle)
Air flow rate: approximately 80 l/h (approximately 1 hour per cycle)
Agitator: 400 rpm
pH: 8.5

Figure 2:
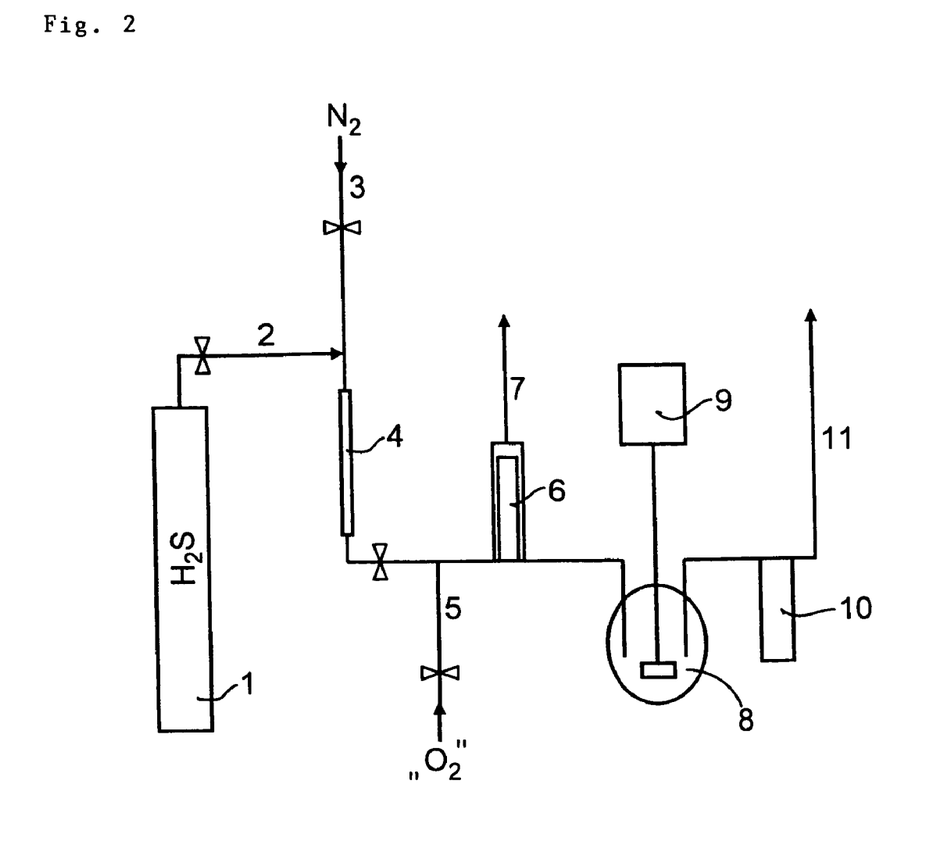

The accompanying FIG. 2 shows diagrammatically a laboratory apparatus setup for carrying out the inventive process:

The figure denotes the following:
1 $H_2S$ reservoir
2 $H_2S$ feed line
3 $N_2$ feed line
4 Flow meter
5 Air feed
6 Overpressure valve
7 Exhaust air outlet line
8 Reaction flask
9 Agitator
10 Wash bottle
11 Exhaust air outlet line FIGS. 3 and 4 below show the results of a study of the decomposition of the respective chelate complexes and measurement of the amount of $H_2S$ as a function of the number of cycles.

Figure 3:
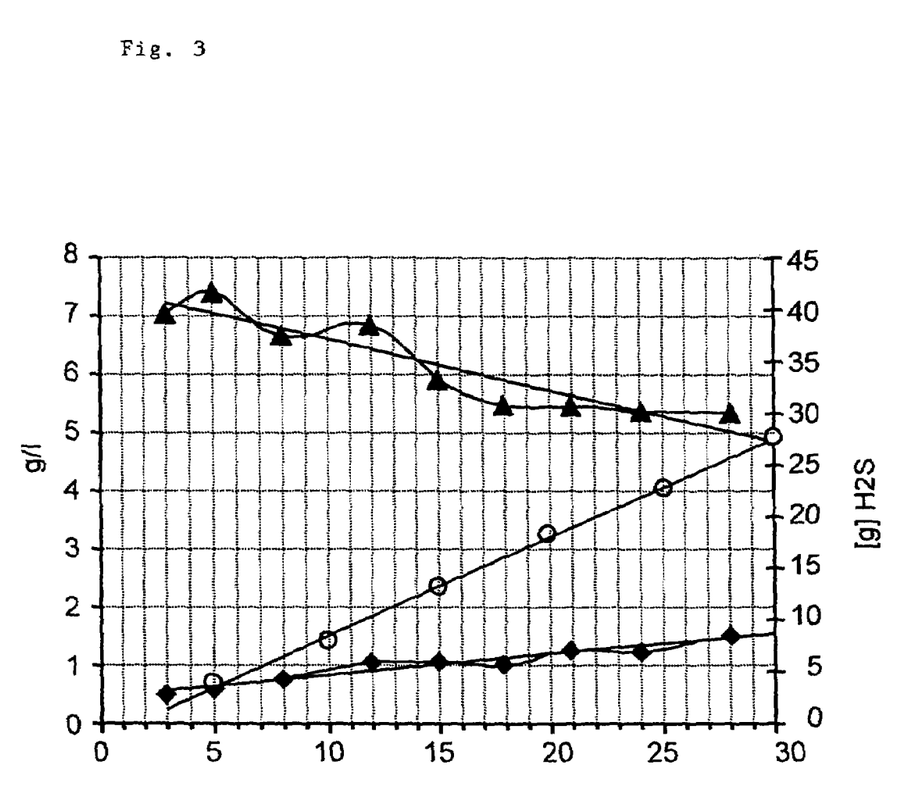
Figure 4:
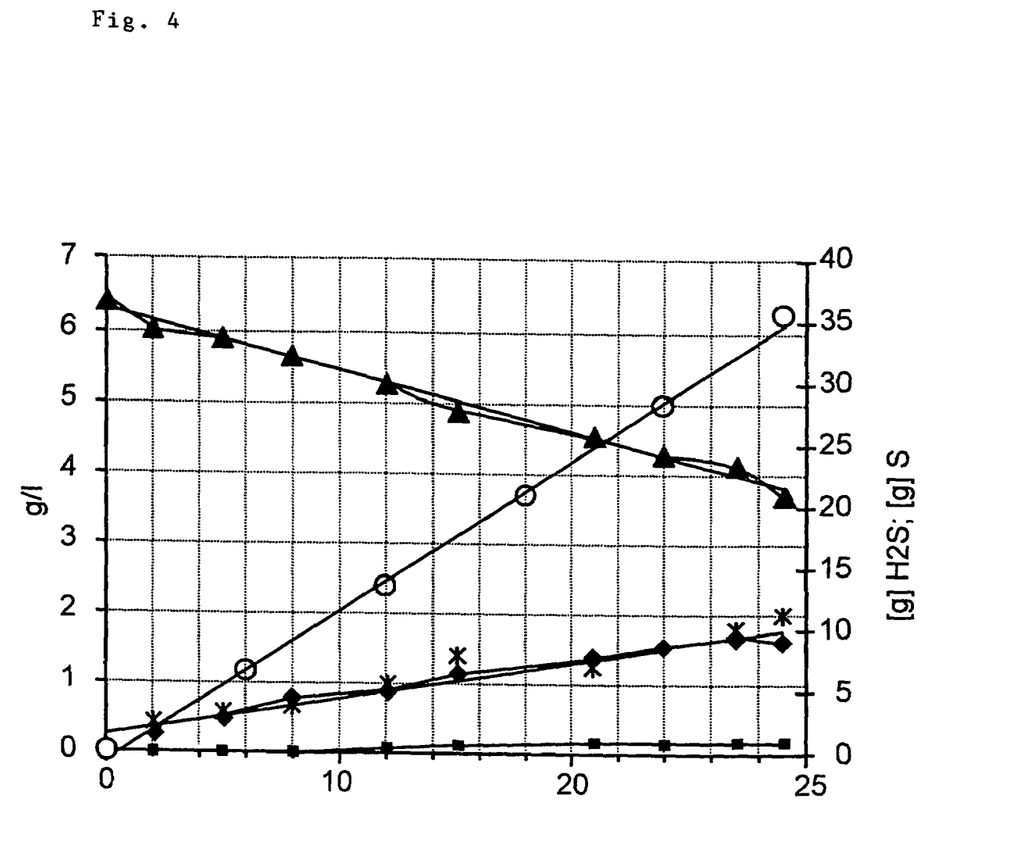

FIG. 3 shows the decomposition of the inventive iron-methylglycinediacetic acid (MGDA) complex as a function of the number of cycles, and FIG. 4 shows the decomposition of the corresponding iron-nitrilotriacetic acid complex as a function of the number of cycles (comparative experiment).

Decomposition of the respective complexes proceeds according to the following reaction:

Iminodiacetate (IDA)    Oxalic acid a) R = CH₃   (MGD)
b) R = H     (NTA)

In FIG. 3, the filled triangles represent the content of methylglycinediacetic acid (MGDA) as a function of the number of cycles. The filled lozenges represent the proportion of imidodiacetate (IDA) as a function of the number of cycles, and the open circles represent the amount of $H_2S$ [in g] passed in total through the solution up to that point as a function of the number of cycles.

In FIG. 4 the filled triangles represent the amount of nitrilotriacetic acid (NTA) as a function of the number of cycles, the filled lozenges represent the proportion of imidodiacetate (IDA) as a function of the number of cycles, the filled squares represent the proportion of oxalic acid as a function of the number of cycles, the open circles represent the amount of $H_2S$ [in g] passed in total through the solution up to that point as a function of the number of cycles and the asterisks represent the total sulfur precipitated out up to that point [in g] as a function of the number of cycles.

A comparison between FIGS. 3 (according to the invention) and 4 (comparative experiment) shows that the decomposition of MDGA (according to the invention) proceeds markedly more slowly than that of NTA (comparative experiment) under the same reaction conditions. The increases in the corresponding decomposition products behave in each case in accordance with the decrease of the chelate complex compounds MGDA or NTA used.

Figure 5:
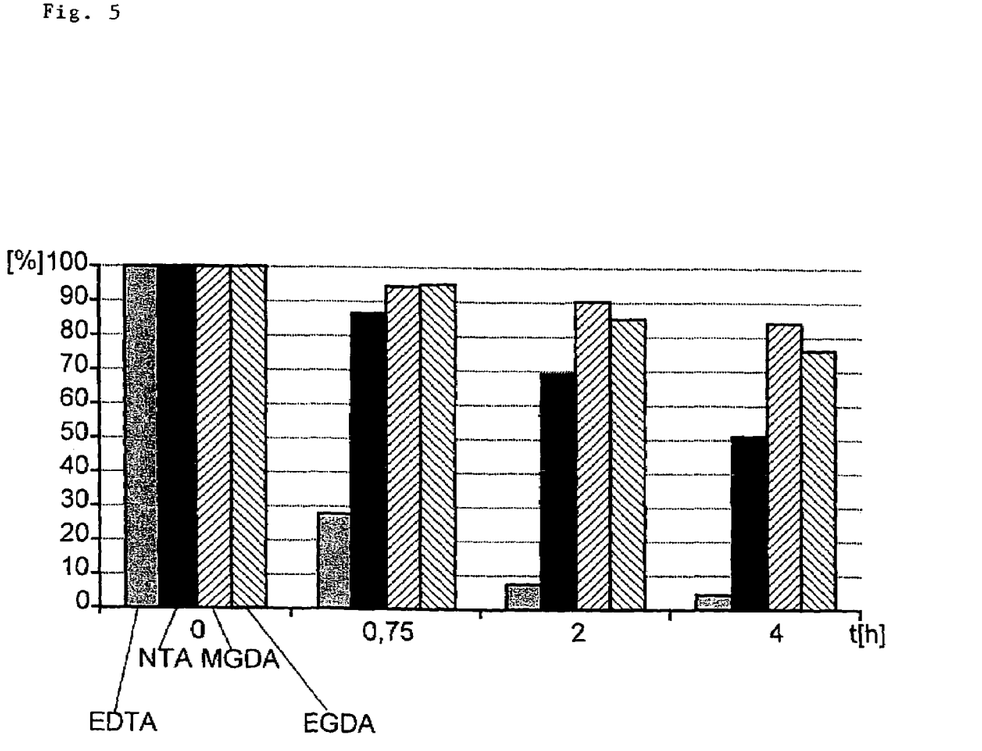

FIG. 5 shows the result of a study of the oxidation stability of various chelate complexes used in sour gas desulfurization, and of the inventively used chelate complex, as a function of time.

In this figure, the time in hours (h) is shown on the x axis and the proportion of chelate complex in % is shown on the y axis in relation to the amount of chelate complex used. The left-hand column shows the data for ethylenediaminetetraacetic acid (EDTA), the second column from the left shows the data for nitrilotriacetic acid (NTA), the third column from the left shows the data for methylglycinediacetic acid (MGDA) (according to the invention) and the right-hand column shows the data for ethylglycinediacetic acid (EGDA) (according to the invention).

The oxidation stability was measured in aqueous solution at a pH of 8.5 and a temperature of 65° C. This solution contained 0.6% of the respective complexing agent, 2% $H_2O_2$ and 60 ppm of manganese.

The figure shows that the inventively used complexes MGDA and EGDA have a greater oxidation stability to $H_2O_2$ than the complexes used according to the comparative examples.

We claim:

1. A process for the catalytic removal of $H_2S$ gas from a sour gas stream comprising:
   a) reducing the amount of $H_2S$ in the sour gas stream by reacting the $H_2S$-containing sour gas stream with an aqueous solution containing a metal chelate complex, a chelate ligand of the general formula (I) being used (I)

where:
X is hydrogen, an alkali metal or $NH_4^+$,
n is 1, 2 or 3, and
at least one of the radicals $R^1$ to $R^6$ is alkyl, aryl, alkyloxy, aryloxy, carboxyl, or hydroxyl, the remaining radicals being hydrogen, and
the metal in the metal chelate complex is a polyvalent metal, which can occur in more than one oxidation state;
at least a part of the metal, after reaction of the $H_2S$-containing sour gas stream, being present in a lower oxidation state (reduced form) than before the reaction;
   b) regenerating the mixture obtained in step a) comprising elemental sulfur and the metal chelate complex, in which at least a part of the metal is present in reduced form, with an oxidizing agent, the reduced form of the metal being oxidized to the metal in the original oxidation state; and
   c) recirculating the regenerated polyvalent metal chelate complex to step a);
   with steps a) and b) being able to be carried out in a single reaction vessel.

2. A process as claimed in claim 1, wherein, in the chelate ligand of the formula (I), the radical $R^6$ is alkyl, hydroxyl or carboxy, and the radicals $R^1$ to $R^5$ are hydrogen.

3. A process as claimed in claim 2, wherein n is 1 and $R^6$ is $C_1$ to $C_3$ alkyl.

4. A process as claimed in claim 2, wherein n is 2 and $R^6$ is hydroxyl.

5. A process as claimed in claim 3, wherein the compound of the formula (I) is methylglycinediacetic acid or the corresponding monosodium, disodium or trisodium salt.

6. A process as claimed in claim 1, wherein the metal is selected from iron, copper, cobalt, nickel and manganese.

7. A process as claimed in claim 6, wherein the metal is iron.

8. A process as claimed in claim 1, wherein the aqueous solution comprises a stabilizer reagent.

9. A process as claimed in claim 8, wherein the stabilizer reagent is selected from ammonium thiosulfate, alkali metal thiosulfate, alkaline earth metal thiosulfate, precursors of thiosulfate ions and monohydric, dihydric or polyhydric alcohols.

10. A mixture for removing $H_2S$ gas from a sour gas stream comprising at least one metal chelate complex as claimed in claim 1.

11. A mixture as claimed in claim 10, wherein stabilizer reagent is additionally present.

12. A process for removing $H_2S$ gas from a sour gas stream comprising the step of reacting a $H_2S$-containing sour gas stream with a metal chelate complex as claimed in claim 1.

* * * * *